UNITED STATES PATENT OFFICE.

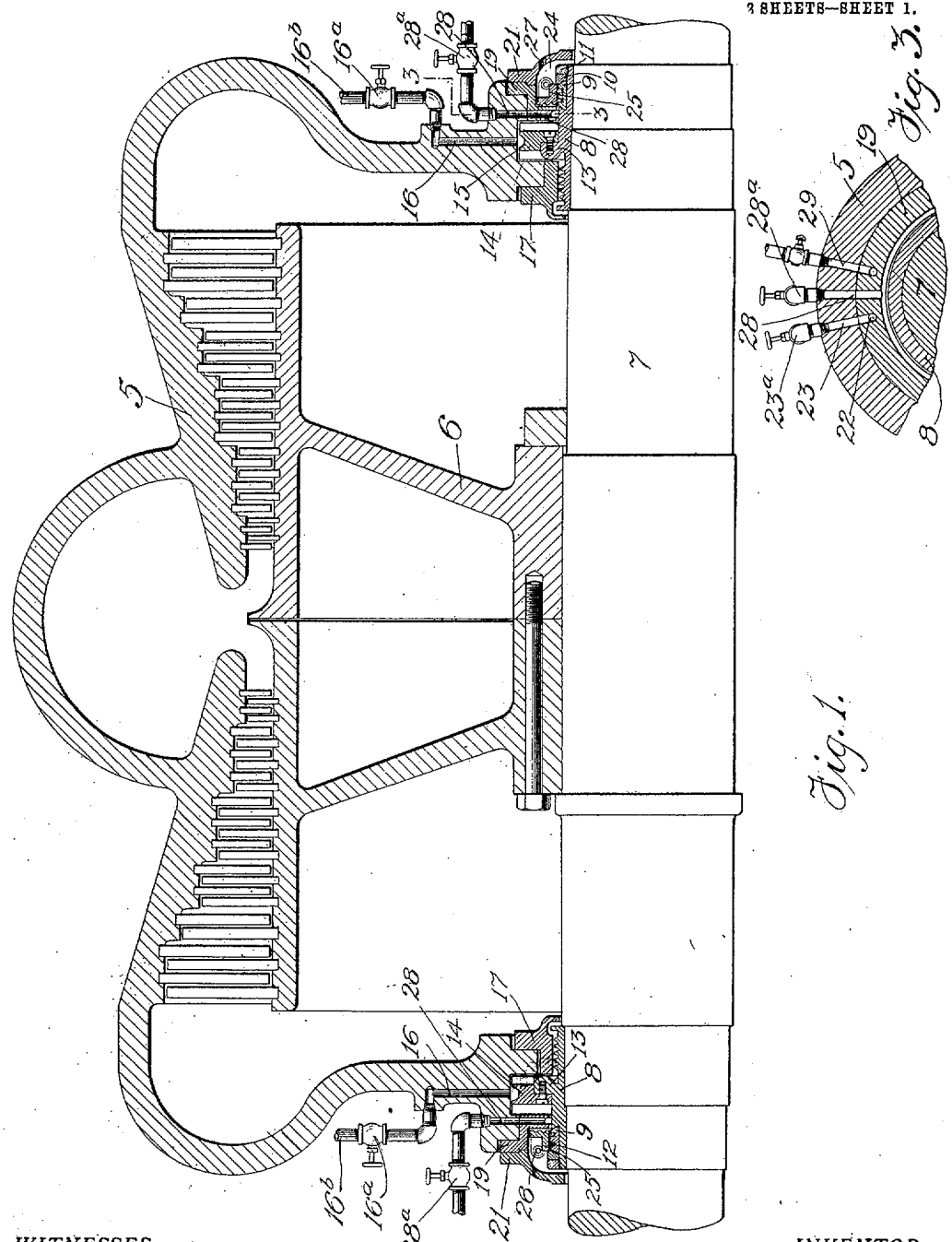

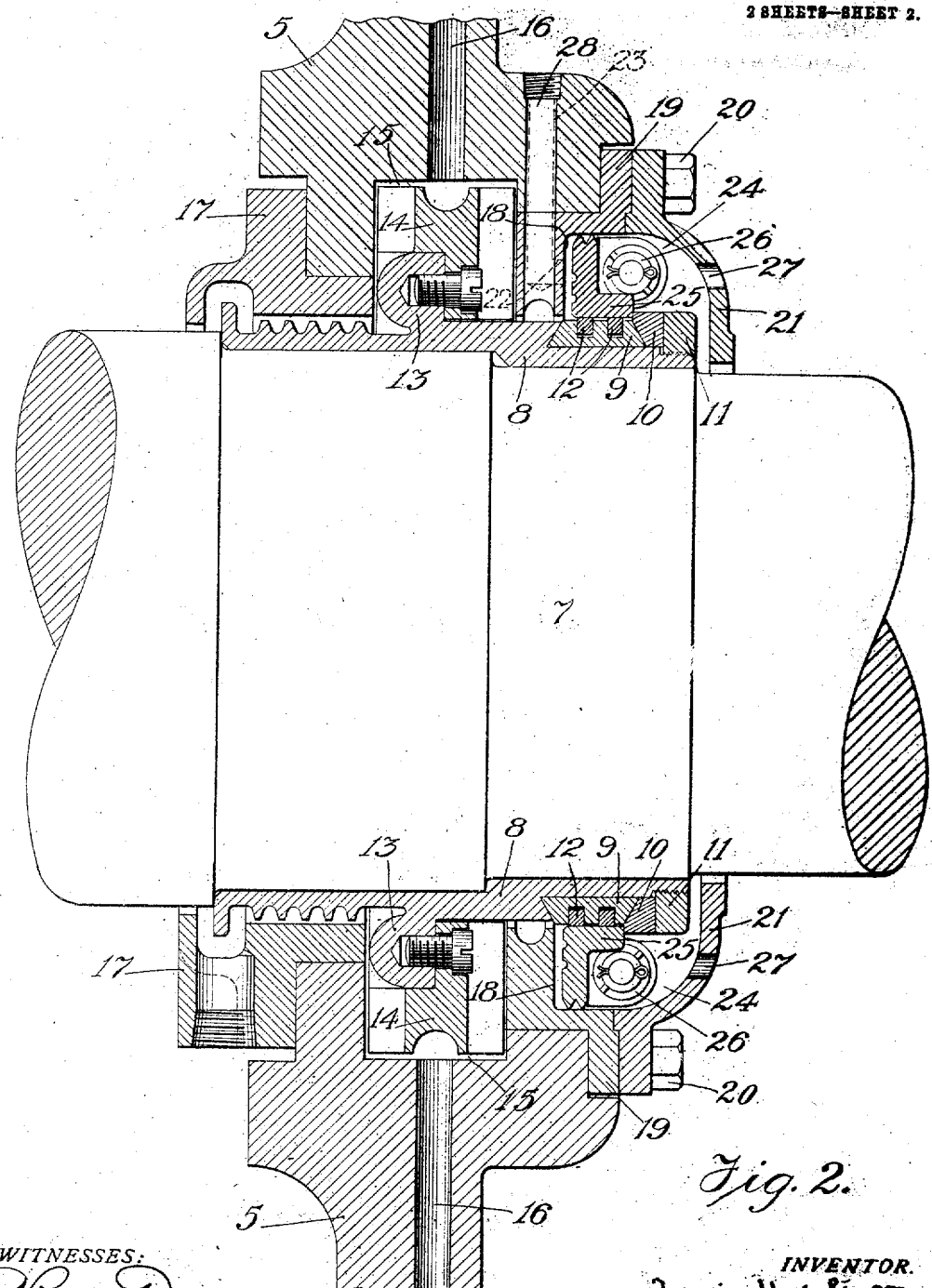

FRANCIS HODGKINSON, OF EDGEWOOD PARK, PENNSYLVANIA, ASSIGNOR TO THE WESTINGHOUSE MACHINE COMPANY, A CORPORATION OF PENNSYLVANIA.

PACKING.

969,869.   Specification of Letters Patent.   Patented Sept. 13, 1910.

Application filed February 13, 1909. Serial No. 477,633.

*To all whom it may concern:*

Be it known that I, FRANCIS HODGKINSON, a subject of the King of Great Britain and Ireland, and a resident of Edgewood Park, in the county of Allegheny and State of Pennsylvania, have made a new and useful Invention in Packing, of which the following is a specification.

This invention relates to packing or means for preventing leakage of fluid from a hollow body, and particularly to means whereby leakage will be prevented from the hollow member of a turbine or similar device.

I have shown my invention as being applied to a low pressure turbine and for the purpose of this specification I shall discuss it in connection therewith.

A water gland alone is unsuitable for a low pressure turbine (particularly in starting) and therefore requires some additional packing. This is necessary because generally there is no steam available above atmospheric pressure for operating the turbine, hence the turbine cannot operate or be set in motion without a vacuum being first established at the exhaust thereof. The ordinary water glands are insufficient to pack the joints of the turbine so that leakage will be prevented and so that a vacuum may be established. The disadvantages of air leakage in the turbine before starting are manifold among which may be stated the cooling effect upon some of the parts of the turbine which causes distortion of parts due to variations in temperature. A mechanical packing which depends upon rubbing surfaces to prevent leakage is objectionable because there is wear due to friction even though the packing be lubricated. When lubrication is provided some of the lubricant will find its way into the exhaust of the turbine with the attendant disadvantages.

In order to overcome the objections above enumerated I have provided means for preventing leakage which consists of a water gland together with a packing element dependent upon rubbing surfaces for its tightness but so arranged that said element may be brought into packing position only temporarily, that is, when the turbine is being started up. As soon as the turbine is speeded up, the packing element may be moved out of packing position and the water gland will efficiently take care of the leakage at the ends of the stator through which the spindle projects.

In the drawings; Figure 1 is a vertical longitudinal sectional view through a turbine to which my invention is applied; Fig. 2 is an enlarged sectional view through the thrust end of the turbine; and, Fig. 3 is a partial sectional view on the line 3—3 of Fig. 1.

Referring now to the drawings by numerals of reference, 5 designates the stator and 6 the rotor, said rotor being provided with the usual spindle 7. The stator 5 is provided with the usual gland openings through which the spindle may pass and on the spindle 7 is a sleeve 8. The sleeve 8 carries a ring 9 secured thereto between the collar 10 and the locking nut 11. The ring 9 is provided with yielding packing rings 12. Spaced a suitable distance from the ring 9 is a flange 13 to which is secured a runner comprising a blade-carrying member 14 for forming a water seal in the chamber 15 between the rotor and stator, the chamber 15 being supplied with water from any suitable source through the ports 16. The chamber 15 is substantially closed on one side by lining ring 17 and part of the stator and the other side of the chamber 15 is substantially closed by the partition or flange 18 carried by the ring 19, bolted to the stator by the fastening devices 20 which also secures the guard 21 to the stator. The flange 18 is provided with a port 22 in communication with a port 23 in the stator, said port 22 communicating with a chamber 24 in which the packing ring or runner 25 is positioned. The packing ring or runner 25 may be made of sections secured together by the fastening devices 26. The packing ring 25 is shown as being substantially L-shaped in cross section and may have a movement longitudinally of the stator and rotor, and under certain conditions, if for example it does not move up under the influence of the vacuum, it may be pushed up into packing position by the operator who may insert a finger or some suitable tool through the opening 27 in the guard 21. The port 23 may be provided with a valve 23ᵃ in a pipe communicating with a suitable water supply and the port 16 may be provided with a valve 16ᵃ in a pipe 16ᵇ leading to a suitable source of water supply.

28 designates a port in the stator and in the flange 18, the said port 28 being provided with a valve 28ᵃ whereby a port 28 may be caused to open to atmosphere to break the vacuum in the annular port 24ᵃ. When the vacuum is broken, water may be admitted through the ports 22 and 23 to unseat the packing ring 25, that is, push it away from the flange 18.

29 designates an oil duct best shown in Fig. 3 whereby oil may be supplied to the packing ring 25 in an obvious manner.

When it is desired to start up the turbine, the condenser pumps may be first put in operation and a partial vacuum formed in the annular port 24ᵃ and between the ring 25 and the wall 18 will draw the ring 25 against the wall 18 (it being understood that at this time the valves 23ᵃ and 28ᵃ are closed). If from any cause the ring 25 fails to move up against the wall 18 under the influence of the partial vacuum the said ring may be manually moved up as heretofore explained. Lubrication may then be turned on so as to lubricate the packing ring 25. As soon as the turbine has attained sufficient speed so that the water gland may be brought into use the valve 28ᵃ may be opened so as to admit atmospheric pressure to the annular port 24ᵃ. The valve 23ᵃ being then opened, water will be admitted through the ports 23 and 22 so as to admit water under pressure into the chamber 24 and against the ring 25 to force it away from the wall 18 or out of packing position. The ring 25 will then rotate idly with the spindle requiring neither attention nor lubrication. After the packing ring 25 is moved out of packing position, the valve 23ᵃ may be closed again. The valve 16ᵃ having been opened and water admitted to the chamber 15 the runner 14 will be efficient in providing a water seal to pack the gland as a film is formed by the centrifugal action of the runner. When the turbine is slowed down the valves 28ᵃ and 16ᵃ may be closed and the packing ring 25 will again be thrown up against the flange 18 to provide a mechanical packing.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. The combination of two parts, one of which is freely movable longitudinally with relation to the other, said parts having a space between them, a movable packing member in said space and means whereby said packing member will be caused to move into packing position.

2. The combination of two parts, one of which is freely movable longitudinally with relation to the other, said parts having a space between them, a movable packing member in said space and means for permitting said packing member to move out of packing position.

3. A motor having two parts, one of which is freely movable longitudinally with relation to the other, a packing ring and a water seal between said parts and means for releasing said packing ring from packing position when the water seal is established.

4. A motor comprising two parts, one of which is freely movable longitudinally with relation to the other, a packing ring and a water seal between said parts, a port for admitting water to the chamber of the water seal and means whereby the packing may be moved into or out of packing position.

5. The combination of a stator and a rotor having an annular chamber therebetween, a packing in the chamber movable longitudinally of the stator and the rotor, a water-seal chamber between the stator and rotor and means for admitting water to the water-seal chamber.

6. The combination of two parts, one of which is movable with relation to the other, a fluid packed gland between said parts and a mechanical packing between said parts and means for moving the latter into and out of packing position.

7. The combination of two parts, one of which is freely movable longitudinally with relation to the other, a fluid packed gland between said parts, and a mechanical packing between said parts.

In testimony whereof, I have hereunto subscribed my name this 11th day of February 1909.

FRANCIS HODGKINSON.

Witnesses:
C. W. McGhee,
B. F. Funk.